United States Patent [19]
Tanis

[11] Patent Number: 5,406,487
[45] Date of Patent: Apr. 11, 1995

[54] AIRCRAFT ALTITUDE APPROACH CONTROL DEVICE

[76] Inventor: Peter G. Tanis, P.O. Box 117, Glenwood, Minn. 56344

[21] Appl. No.: 243,098

[22] Filed: May 16, 1994

Related U.S. Application Data

[63] Continuation of Ser. No. 775,129, Oct. 11, 1991, abandoned.

[51] Int. Cl.⁶ .......................................... G08B 23/00
[52] U.S. Cl. ..................................... 364/428; 364/427; 364/433; 73/178 T
[58] Field of Search .................. 364/427, 428, 433; 340/946, 970; 367/116; 244/183; 73/178 T

[56] References Cited

U.S. PATENT DOCUMENTS

| | | | |
|---|---|---|---|
| 2,830,291 | 4/1958 | Hecht et al. | 343/108 |
| 3,015,459 | 1/1962 | McLane et al. | 244/77 |
| 3,203,652 | 8/1965 | Doniger et al. | 244/77 |
| 3,293,594 | 12/1966 | Greene, Jr. | 340/1 |
| 3,327,973 | 6/1967 | Kramer et al. | 244/77 |
| 3,327,973 | 6/1967 | Kramer et al. | 244/77 |
| 3,715,752 | 2/1973 | Garrett | 343/7.3 |
| 3,887,148 | 6/1975 | Devlin | 244/77 A |
| 3,946,358 | 3/1976 | Bateman | 340/27 R |
| 3,976,267 | 8/1976 | Meyer et al. | 244/186 |
| 3,999,007 | 12/1976 | Crane | 358/104 |
| 4,004,758 | 1/1977 | Boriss et al. | 244/17.13 |
| 4,093,159 | 6/1978 | Gilson | 244/187 |
| 4,127,248 | 11/1978 | Boone et al. | 244/180 |
| 4,213,184 | 7/1980 | Fasching | 364/574 |
| 4,232,839 | 11/1980 | Sicre et al. | 244/188 |
| 4,354,237 | 10/1982 | Lambregts et al. | 364/428 |
| 4,357,661 | 11/1982 | Lambregts et al. | 364/430 |
| 4,368,517 | 1/1983 | Lovering | 364/428 |
| 4,368,900 | 1/1983 | Beusse | 280/707 |
| 4,439,846 | 3/1984 | Rodriguez | 367/99 |
| 4,464,738 | 8/1984 | Czajkowski | 367/97 |
| 4,551,723 | 11/1985 | Paterson | 340/946 |
| 4,684,948 | 8/1987 | Bateman | 340/970 |
| 4,695,013 | 9/1987 | Trampnau | 244/17.13 |
| 4,858,778 | 8/1989 | Patrick | 220/5 A |
| 4,979,154 | 12/1990 | Brodeur | 367/116 |
| 4,987,413 | 1/1991 | Grove | 340/970 |
| 5,047,942 | 10/1991 | Middleton et al. | 364/427 |
| 5,260,702 | 11/1993 | Thompson | 340/970 |

Primary Examiner—Gary Chin
Assistant Examiner—Stephen J. Walder, Jr.
Attorney, Agent, or Firm—L. Paul Burd; Richard O. Bartz; Robert W. Gutenkauf

[57] ABSTRACT

An improved aircraft altitude approach control device is characterized by both visible and audible indications of changes in the aircraft altitude as the aircraft descends to a landing. A transducer is provided on the aircraft which produces an output signal corresponding to the altitude of the aircraft. The output signal is converted to a digital signal and then to an analog voltage signal. A voltage controlled oscillator produces an audio frequency signal whose pitch corresponds with altitude. A further characteristic of the invention is the provision of a memory circuit in which a digital signal corresponding to a preferred landing is stored. This signal can be modified to produce a preferred or reference analog voltage signal. The actual and reference voltage signals are delivered to a glide slope meter which indicates differences therebetween. Thus, a pilot can gauge his landing approach relative to the reference or preferred landing approach.

17 Claims, 4 Drawing Sheets

AIRCRAFT ALTITUDE APPROACH CONTROL DEVICE

This application is a continuation of application Ser. No. 07/775,129, filed Oct. 11, 1991, now abandoned.

BACKGROUND OF THE INVENTION

Landing an aircraft is a very complex task. An experienced pilot calls upon conditioned responses to rapidly changing occurrences which are observed through sight, feel, hearing and kinesthesis. There are many control options available to the pilot, each affecting two or three variables. For example, if the pilot senses that he is too high and applies forward pressure on the control wheel, the aircraft will lower its nose, speed up, and move further down the runway and may be too fast to accomplish the stall desired for a good landing. The pilot must respond with coordinated use of several of the controls available to him. To accomplish a good landing, the pilot normally stabilizes as many of the variables as he can and then deals with the remaining ones with coordinated use of the controls.

Learning this complex operation is difficult for a student pilot, often requiring many hours of training. One of the main problems is learning how to observe the rapidly changing environment while maintaining control of the aircraft. For example, when an aircraft is landed, it must be "stalled" just as the wheels touch the ground. The pilot must accurately judge this altitude by looking out of the window while keeping the aircraft straight with the runway. He can not be looking at his instrument panel, and if he fixes his attention on one point, he will contact the ground at the wrong time and bounce the aircraft. Many experienced pilots often lapse into inattentiveness and make a poor landing.

Instrument pilots face the same problems in another environment. They fly an instrument landing system to an elevation of 100 to 200 feet, at which point the pilot must see the runway. He must then react to what he sees to correctly land the aircraft. Seaplane pilots often make bad landings due to their inability to judge height above smooth water.

BRIEF DESCRIPTION OF THE PRIOR ART

Automatic pilots have been developed which approximate a proper landing. These are normally limited to large commercial aircraft for several reasons including weight, complexity and cost. Auto pilots are quite good at flying the instrument landing system part of the approach. However, they do a poor job of the final landing and pilots usually mistrust them. Large aircraft have a much higher mass than typical light aircraft. Because of this they have more inertia to continue in a straight line and have less tendency to bounce if they contact the runway in a small rate of descent. Auto pilots take advantage of this to approximate the proper landing using a three stage approach. The first stage is flying the instrument landing system (ILS). The second stage is a period commonly referred to as "dead reckoning" following loss of the ILS signal. In this stage, a computer approximates the previous flight path and is updated with information from a radar altimeter. The third stage begins when the aircraft comes within one wing span of the ground and the control switches to a flare computer which approximates the flare normally done by the human pilot.

These auto pilots flare and land typically in the following ways. Some simply run the aircraft into the ground in a small but positive rate of closure. Others bring the aircraft to level flight just above the ground, allow it to slow and then drop onto the ground. This uses a great amount of runway length so in response to this, at some point in the "flare" the auto pilot is programmed to pitch the nose down allowing the aircraft to run into the ground. The flare computer determines a calculated flight path to produce the desired results. Pilots normally prefer to fly the landing by hand because it is difficult to take the aircraft away from an auto pilot during the landing flare if it malfunctions.

The present invention was developed to overcome the drawbacks of the prior auto pilot systems by providing an improved altitude indicating device for a lightweight fixed wing aircraft which informs the pilot of his altitude and rate of ground closure during landing. This is done by providing audio and visual flare reference with respect to a previous correctly executed landing.

SUMMARY OF THE INVENTION

The apparatus for indicating the altitude of an aircraft during a landing approach according to the invention includes a transducer which produces an output signal corresponding to the altitude of the aircraft relative to the ground. A display driver and counter are connected with the transducer for producing a digital altitude signal from the transducer output signal. A digital LED display device is connected with the display driver to indicate the descending altitude of the aircraft as it lands.

An audio indication of the altitude of the aircraft is also provided. In order to produce the audio output, a ripple counter, a first digital to analog converter, and a voltage controlled oscillator are provided. The ripple counter is connected with the display driver and counter and produces a series of digital voltage pulses in a given period representing the altitude during that period. The first digital to analog converter is connected with the ripple counter and converts the digital voltage pulses to an analog voltage signal which varies over time. The voltage controlled oscillator produces an audio frequency signal from the analog voltage signal which is delivered to a speaker to produce an audio output. A high pitch audio output indicates a high altitude and low pitch audio output indicates a low altitude.

According to a more specific embodiment of the invention, a memory is provided within which a sequence of digital voltage pulses representing the altitude of a preferred landing descent for a particular aircraft are stored according to a previous correctly executed landing by a human pilot on the same aircraft. A second digital analog converter is connected with the memory to convert the preferred sequence of digital voltage pulses to a preferred analog voltage signal. The preferred analog voltage signal and the actual landing analog voltage signal are delivered to a glide slope meter which indicates the difference between the signals to assist a pilot in adjusting the aircraft to the preferred landing descent.

According to another object of the invention, the transducer is mounted beneath the wing of the aircraft using a baffle and shock-absorbing material so that the transducer is isolated from vibrations of the aircraft.

BRIEF DESCRIPTION OF THE FIGURES

Other objects and advantages of the invention will become apparent from a study of the following specification when viewed in the light of the accompanying drawing, in which:

FIG. 1 is a block diagram of the aircraft altitude approach control tone generator circuit;

DETAILED DESCRIPTION

Figure 4:
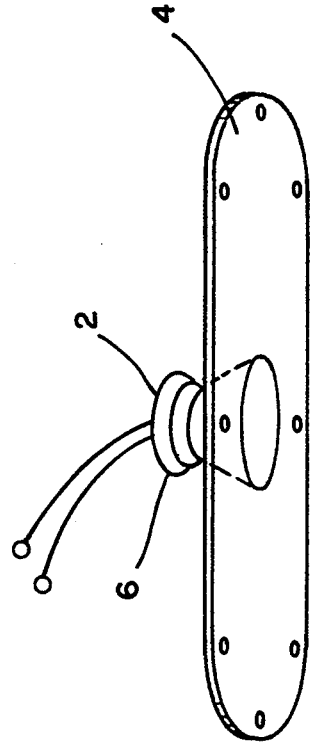
FIG. 4 is a perspective view of the transducer mounting assembly according to the invention.

The apparatus for indicating the altitude of an aircraft during a landing approach according to the invention will first be described with reference to FIG. 1. As shown therein, the apparatus includes a transducer 2 which is mounted on the aircraft. The transducer is mounted on the underside of the wing of the aircraft just forward of the wing flap so that it is arranged in an area where air flow and its associated noise are at a minimum. This location thus shields the transducer from the noise and air pressures generated by air flow over the wing. As shown in FIG. 4, the transducer 2 is preferably connected with the wing of the aircraft via a baffle 4. The baffle replaces an inspection plate on the underside of the wing just forward of the wing flap. The baffle is preferably conically shaped, with the transducer mounted in the apex of the cone on a shock-absorbing support 6. The location of the transducer, and its baffle/shock-absorbing mounting arrangement prevents the transducer from responding to noise and vibration produced by the aircraft. It will be appreciated by those skilled in the art that each particular type of aircraft will require a differently shaped and mounted baffle assembly.

Referring once again to FIG. 1, the transducer 2 is of the ultrasonic type which generates pulses to the ground and receives echoes therefrom. The transducer produces an output in response to the echoes which is a function of the distance from the transducer to the ground. Thus, the output signal from the transducer corresponds to the altitude of the aircraft relative to the ground. The output signals are delivered to a range finder circuit board 8 which processes the output signals from the transducer so that they correlate to the altitude of the aircraft. A display driver board 10 including a binary counter 12 is connected with the range finder circuit board and produces a digital altitude signal corresponding to the output signals from the transducer. A visual indication of the instantaneous aircraft altitude as provided on a digital LED display 14 connected with the display driver circuit board 10. The digital display is mounted at a location in the aircraft where it can be seen by the pilot.

A characterizing feature of the invention is that an audio output signal is also generated which corresponds with the aircraft altitude and which varies as the aircraft makes a landing. More particularly, a tone generator circuit board 16 is connected with the display driver board 10 for generating an audio signal corresponding with the digital altitude signal produced by the display driver board. The tone generator board 16 includes a buffer 18 connected with the binary counter 12 of the display driver board. A ripple counter 20 is connected with the output of the buffer. The ripple counter produces a series of digital voltage pulses for a given period of time representing the altitude of the aircraft during that period. A first digital to analog converter 22 is connected with the ripple counter and converts the digital voltage pulse to an analog voltage signal which varies over time. The analog voltage signal is amplified by operational amplifiers 24, 26 and delivered to a voltage controlled oscillator 28 which produces an audio frequency signal from the analog voltage signal. The audio frequency signal is amplified by a further operational amplifier 30 and adjusted via a rheostat 32 in order to match the input impedance of the aircraft audio amplifier 34. The audio frequency signal is then provided to an audio speaker such as the headset 36 so that an audio output is produced which can be heard by the pilot. A high pitch audio output corresponds with high altitude of the aircraft and a low pitch audio output indicates a low altitude. Thus, the audio output varies as the aircraft descends during the landing thereof.

Figure 2:
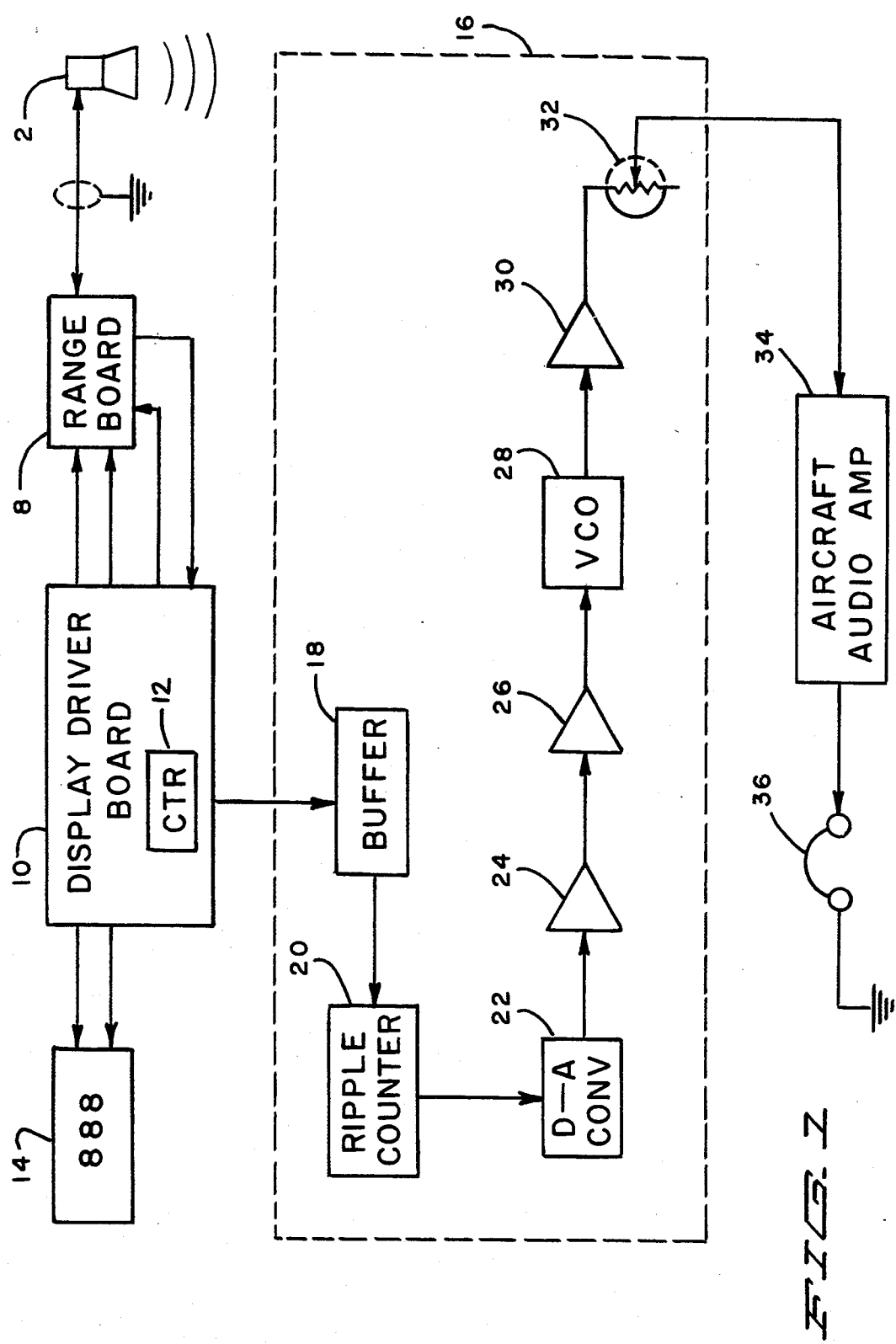
FIG. 2 is a block diagram of a preferred embodiment of the invention including a glide slope meter for comparing an actual landing with a preferred landing.
Figure 2:
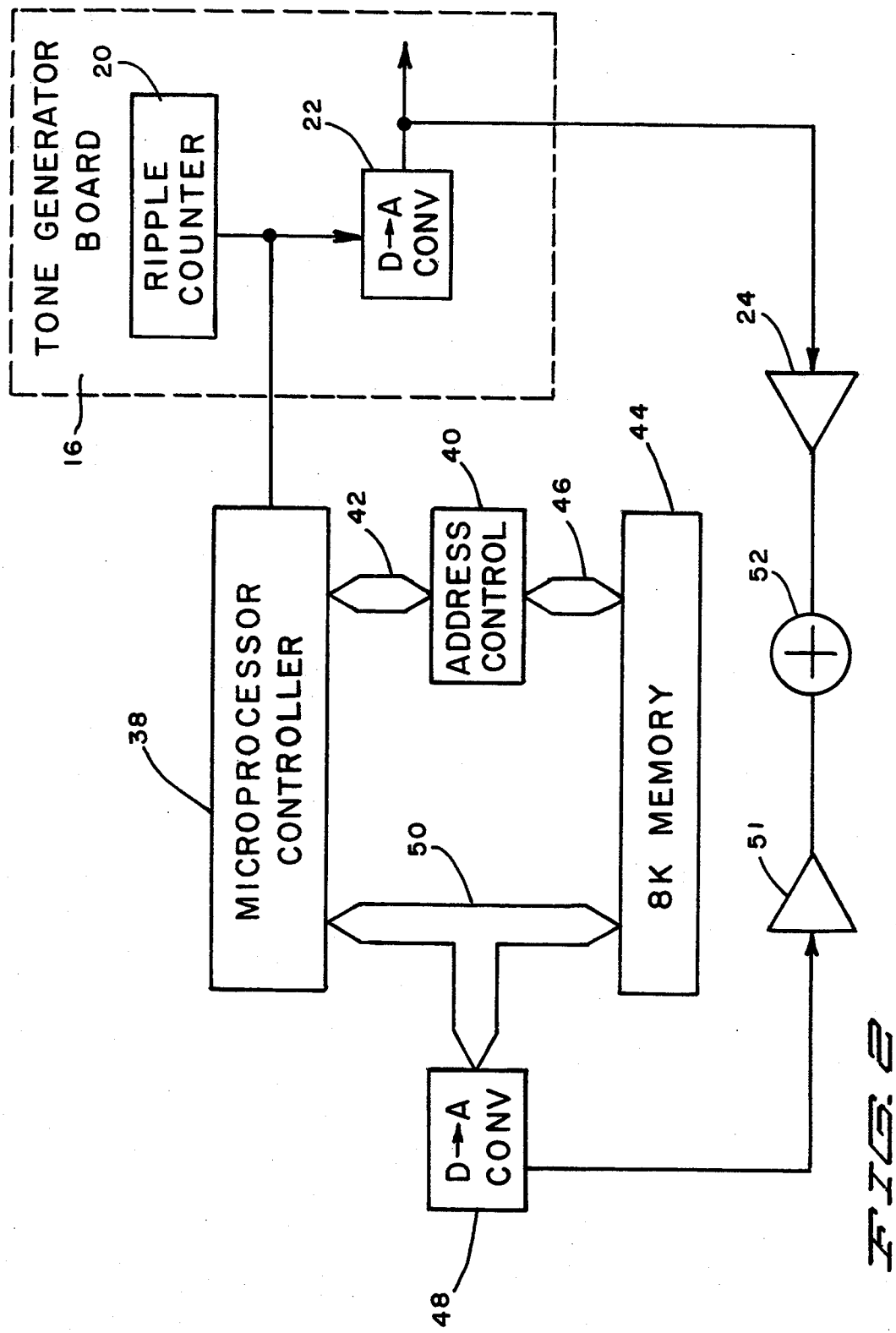

Referring now to FIG. 2, a preferred embodiment of the invention will be described. In the preferred embodiment, a memory circuit is connected with the tone generator board 16 in order to record the rate of change of altitude when a proper landing is made by an experienced pilot for that particular aircraft. A signal representing the aircraft altitude is taken from the output of the ripple counter 20 and delivered to a microprocessor controller 38 in digital form. This data is formed into 8-bit words and sent to an address control circuit 40 via a data bus 42. The address control circuit 40 assigns a location in an 8K memory chip 44 and transfers the data thereto via data bus 46. This stored data represents the altitude versus time of a properly executed landing. The series of digital voltage pulses representing the altitude during a preferred landing descent can either be preprogrammed into the memory 44 or recorded therein based upon an actual landing performed by an experienced pilot, where the actual landing corresponds to a preferred or "perfect" landing approach.

The stored information corresponding to a preferred landing can be recalled from, the memory for comparison with an actual landing in the following manner. The data stored in the memory is delivered to a second digital to analog converter 48 via a data bus 50 under control of the microprocessor controller 38. The second digital to analog converter produces a preferred analog voltage signal corresponding with the preferred sequence of digital voltage pulses stored in the memory. The preferred analog voltage signal is amplified by an operational amplifier 51 and delivered to a glide slope meter 52. The glide slope meter 52 also receives the actual landing analog voltage signal from the first digital to analog converter 22 (which is amplified by the operational amplifier 24) and compares the voltage signals. The difference between the actual landing analog voltage signal and the preferred landing analog voltage signal is indicated on the glide slope meter 52, thereby to indicate to the pilot whether he is above or below the preferred landing altitude.

Figure 5:
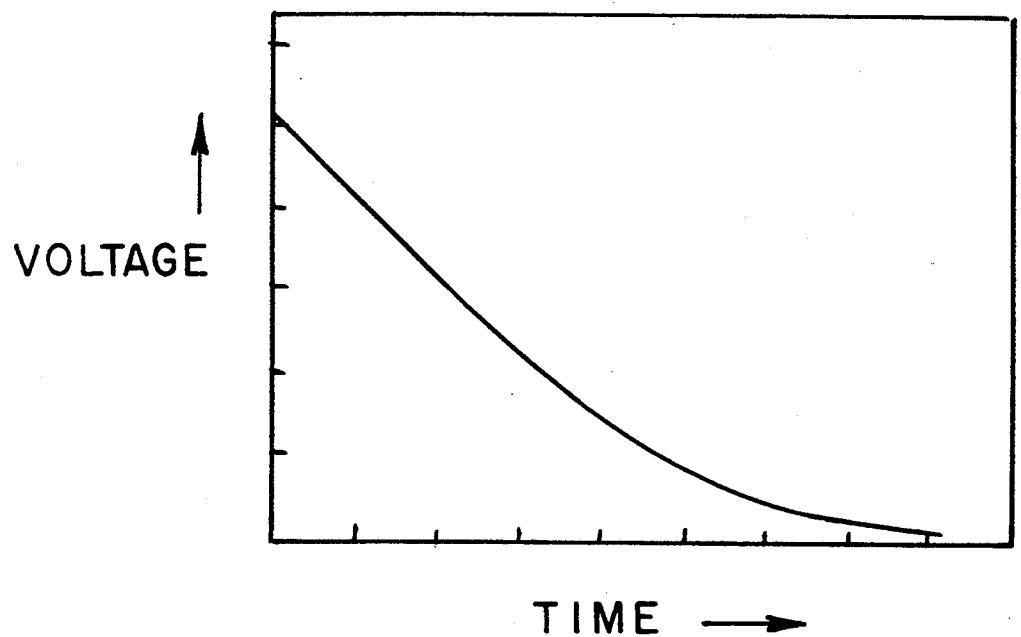
FIG. 5 is a graphical illustration of a preferred landing analog voltage signal plotted against time.

There is shown in FIG. 5 a graphical representation of the preferred analog voltage signal generated by the second digital to analog converter. As shown therein, the voltage decreases over time, which corresponds with the decreasing altitude of the aircraft as it makes its landing. The voltage shown in FIG. 5 is the standard voltage to produce a proper glide path. The actual landing approach in progress also produces voltage at the output of the first digital to analog converter 22. The two voltages are placed across the standard glide slope indicator meter. If the voltages are the same, the glide path is the same as the preferred reference glide path and the meter will remain at zero for the on glide path indication. If the aircraft is above the referenced glide path, the actual voltage will be higher causing the meter to deflect below the zero position and provide a "fly down" indication. If the aircraft is below the referenced glide path, the reference voltage will be higher than the actual voltage and the meter will deflect above the zero position giving the pilot a "fly up" indication. Although not shown in the drawing, the glide slope meter also includes other wires for connection with the glide slope receiver (which is a part of the instrument landing system) and connections for auto pilot coupling.

Figure 3:
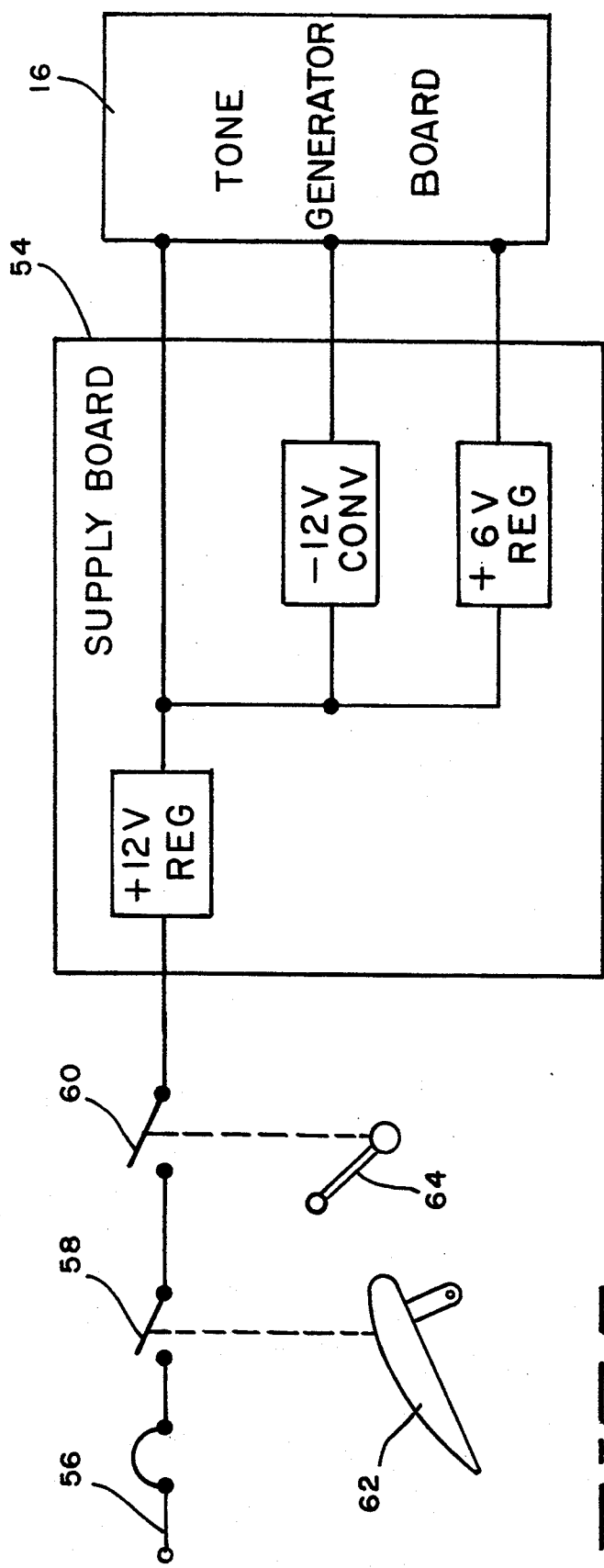
FIG. 3 is a block diagram of the power supply for the circuit of FIG. 1.

There is shown in FIG. 3 the power supply circuitry for the altitude indicating device according to the invention. The tone generator board 16 is connected with a power supply circuit board 54 which produces 6 and 12 volt outputs. The power supply board 54 is connected with the electrical system of the aircraft 56 via two microswitches 58, 60 connected with the flap and throttle controls 62, 64, respectively. The microswitches energize the power supply board and thus the aircraft altitude approach control system so that it will operate only when the aircraft controls are in a position used for landing. When the aircraft is in the landing configuration (i.e., when the flaps and throttle are set for landing), the system is energized. The useful range of the invention is from zero feet to 35 feet, but the system can be modified to operate at altitudes up to 70 feet.

Figure 6:
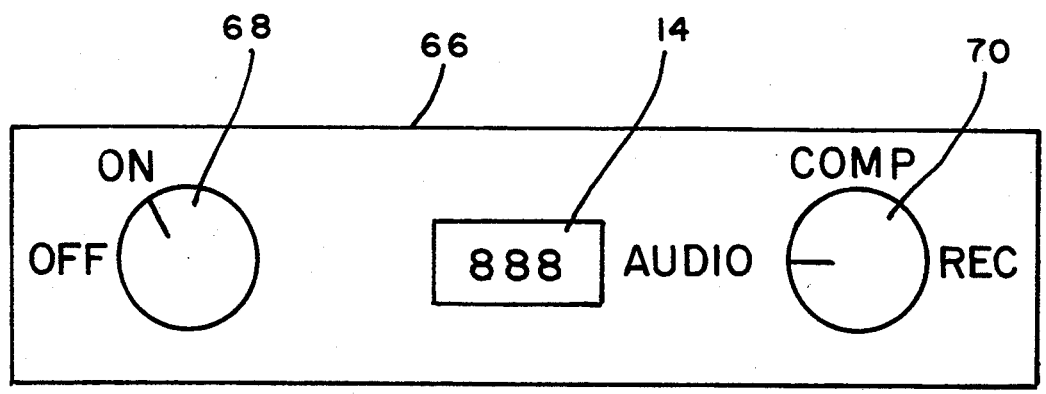
FIG. 6 is a plan view of a control panel of the invention.

There is shown in FIG. 6 a control panel, which is accessible to the pilot of the aircraft, for controlling the operation of the aircraft altitude indicating device. The control panel 66 includes an on/off switch which controls the operation of the micro-processor controller 38. A selection switch 70 is operable to control the functional operation of the invention. It has settings to place the memory 44 in the record mode, whereby the digital voltage pulses produced during an actual landing are recorded in the memory. The switch 70 also includes a compare mode which controls the delivery of the signals from the memory and from the first digital to analog converter to compare an actual landing with a preferred landing. Finally, there is an audio setting for the switch 70 whereby the invention can be used to produce the audio output from the tone generator board via the headset 36. The panel 66 also includes the digital LED display 14.

In accordance with the invention, a pilot can guide his aircraft during landing thereof with respect to a preferred landing descent stored in the memory. This enables the pilot to imitate a preferred landing even though he might not be able to see the ground. The glide slope meter is commonly coupled to the auto pilot system of the aircraft in order to control the aircraft pitch. In this case, a coupled auto pilot approach could be flown all the way to touchdown. The memory of the invention can be programmed by other sensors of parameters that are significant to the approach and landing such as air speed, power setting, distance, and ground speed.

The initiation of the altitude approach control device preferably begins either at a preset altitude when the recorded and measured voltages corresponding to the altitude are the same, or when the instrument landing system glide slope becomes unreliable if an instrument landing system was in progress as determined by rapid deflection of the glide slope needle.

While in accordance with the provisions of patent statute the preferred forms and embodiments of the invention have been illustrated and described, it will be apparent to those of ordinary skill in the art the various changes may be made without deviating from the inventive concept set forth above. For example, the present invention is suitable for use with a radar altimeter and could easily be incorporated therein.

What is claimed is:

1. Apparatus for indicating to the pilot of an aircraft, the altitude of the aircraft as it changes during a landing approach, as compared to a desired altitude, by comparing the actual altitude with an altitude recorded during a previously correctly executed landing approach, and indicating deviations therefrom so that the pilot can make adjustment in order to conform the landing approach to the previously correctly executed approach, comprising:
   (a) transducer means mounted on the aircraft for producing upon a landing approach an electrical output signal corresponding to the altitude of the aircraft relative to the ground;
   (b) a first digital to analog converter connected to the transducer means to produce an analog voltage representative of the altitude sensed by the transducer means;
   (c) memory means located in the aircraft;
   (d) a series of digital voltage pulses stored on the memory means, said series of pulses having been generated by recording the digital voltage produced by a transducer during a previously correctly executed landing approach on the same aircraft;
   (e) a second digital to analog converter connected to the memory means to retrieve the voltage signal from the memory means representative of the previously correctly executed landing approach;
   (f) means for comparing the signals from the first digital analog converter and the second digital to analog converter; and
   (g) display means for displaying the difference between the two signals to permit the pilot to make adjustment accordingly during an actual landing approach.

2. Apparatus for indicating the altitude of an aircraft during a landing approach, comprising:
   (a) transducer means mounted on the aircraft for producing an output signal corresponding to the altitude of the aircraft relative to the ground;
   (b) driver means comprising a counter connected with said transducer means for producing a digital altitude signal from said output signal;
   (c) tone generator means connected with said driver means for producing a variable audio tone corresponding with said digital altitude signal, whereby a high pitch audio tone indicates a high altitude and a low pitch indicates a low altitude of the aircraft as the aircraft descends during landing;

(d) memory means connected with said tone generator means having recorded thereon a series of digital pulses according to the rate of change of altitude during a previous correctly executed landing on the same aircraft, said series of digital pulses serving as a reference; and (e) means for comparing said series of reference digital pulses with said digital altitude signal to produce a signal indicating the difference between the actual aircraft altitude and the preferred altitude of the previous correctly executed landing.

3. Apparatus as defined in claim 2, and further comprising switching means for energizing said transducer means, driver means and indication means when a flap setting lever and a throttle of the aircraft are set for landing the aircraft.

4. Apparatus as defined in claim 2, wherein said tone generator means includes (a) a ripple counter for producing a series of digital voltage pulses from said digital altitude signal in a given period representing the altitude during that period; and (b) a first digital to analog converter connected with said ripple counter for converting said digital voltage pulses to an analog voltage signal which varies over time.

5. Apparatus as defined in claim 4, and further comprising a voltage controlled oscillator connected with said first digital to analog converter for producing an audio frequency signal from said analog voltage signal.

6. Apparatus as defined in claim 5, and further comprising means for comparing a voltage signal from an actual landing with a voltage signal corresponding with the altitude of a previous correctly executed landing of the aircraft.

7. Apparatus as defined in claim 6, wherein said comparing means comprises;

(1) a microprocessor controller connected with said ripple counter for receiving a preferred sequence of digital voltage pulses representing the altitude during a previous correctly executed landing of the aircraft; and (2) memory means connected with said microprocessor controller for retaining said preferred sequence of digital pulses.

8. Apparatus as defined in claim 4, wherein said comparing means comprises;

(1) a microprocessor controller connected with said ripple counter for receiving a preferred sequence of digital voltage pulses representing the altitude during a previous correctly executed landing of the aircraft; and (2) memory means connected with said microprocessor controller for retaining said preferred sequence of digital voltage pulses.

9. Apparatus as defined in claim 8, and further comprising a second digital to analog converter connected with said memory means for converting said preferred sequence of digital voltage pulses to a preferred analog voltage signal.

10. Apparatus as defined in claim 9, wherein said comparing means further comprises a glide slope meter connected with said first and second digital to analog converters, respectively, for indicating the difference between an actual landing analog voltage signal and said preferred analog voltage signal.

11. Apparatus as defined in claim 2, and further comprising shock absorbing means for mounting said transducer beneath a wing of the aircraft, thereby to isolate said transducer from vibrations of the aircraft.

12. Apparatus as defined in claim 11, wherein said shock absorbing mounting means include a baffle connected with an aircraft wing and shock absorbing material connecting said transducer with said baffle.

13. Apparatus for indicating the altitude of an aircraft during a landing approach, comprising:

(a) transducer means mounted on the aircraft for producing an output signal corresponding to the altitude of the aircraft relative to the ground;

(b) driver means comprising a counter connected with said transducer means for producing a digital altitude signal from said output signal;

(c) memory means connected with said counter and having recorded thereon a series of digital pulses according to the rate of change of altitude during a previous correctly executed landing on the same aircraft, said series of digital pulses serving as a reference; and (d) means for comparing said series of reference digital pulses with said digital altitude signal to produce a signal indicating the difference between the actual aircraft altitude and the preferred altitude of the previous correctly executed landing.

14. A method for indicating to a pilot of an aircraft the altitude of the aircraft as it changes during a landing approach, comprising of the steps of:

(a) storing a first series of digital voltage pulses generated during a previously correctly executed landing approach of the aircraft, and corresponding with the altitude of the aircraft;

(b) generating a second series of digital voltage pulses corresponding with the actual altitude of the aircraft;

(c) comparing said first and second series of digital voltage pulses to produce a signal representing the difference between the actual aircraft altitude and the altitude of the aircraft during said previously executed landing approach of the aircraft; and (d) indicating to the pilot the difference between the previous and the actual altitudes, whereby the pilot may take corrective action to align the actual aircraft altitude during a landing approach with the altitude of the previously executed landing approach.

15. A method as defined in claim 14, wherein said first series of digital voltage pulses are stored in a memory for repeated comparison on subsequent landing approaches.

16. A method as defined in claim 15, wherein said indicating step comprises providing an audio indication of the difference between the previous and actual altitudes.

17. A method as defined in claim 15, wherein said indicating step comprises providing a visual indication of the difference between the previous and actual altitudes.

* * * * *